(12) United States Patent
Mitrovich

(10) Patent No.: US 7,820,598 B2
(45) Date of Patent: *Oct. 26, 2010

(54) SOLID LUBRICANT STICKS HAVING A TWO PART FORMULATION

(76) Inventor: Michael J. Mitrovich, 6016 NE. Bothell Way, Suite C, PMB 471, Kenmore, WA (US) 98028

( * ) Notice: Subject to any disclaimer, the term of this patent is extended or adjusted under 35 U.S.C. 154(b) by 556 days.

This patent is subject to a terminal disclaimer.

(21) Appl. No.: 11/676,413

(22) Filed: Feb. 19, 2007

(65) Prior Publication Data

US 2007/0142236 A1 Jun. 21, 2007

Related U.S. Application Data

(60) Continuation-in-part of application No. 11/295,711, filed on Dec. 5, 2005, and a continuation-in-part of application No. 10/655,082, filed on Sep. 3, 2003, now abandoned, and a division of application No. 10/123,001, filed on Apr. 11, 2002, now Pat. No. 6,649,573.

(60) Provisional application No. 60/633,279, filed on Dec. 3, 2004, provisional application No. 60/283,869, filed on Apr. 13, 2001.

(51) Int. Cl.
*C10M 169/00* (2006.01)

(52) U.S. Cl. .................. 508/100; 508/129; 508/131; 508/148; 508/167; 508/180; 508/450; 508/591

(58) Field of Classification Search .................. 508/100, 508/129, 131, 167, 591
See application file for complete search history.

(56) References Cited

U.S. PATENT DOCUMENTS

| 2,589,582 | A | | 3/1952 | Strughold et al. |
| 3,433,742 | A | | 3/1969 | Banta |
| 3,537,819 | A | | 11/1970 | Wiesboeck |
| 3,541,011 | A | | 11/1970 | Davis |
| 3,607,746 | A | | 9/1971 | Caruso |
| 3,729,415 | A | | 4/1973 | Davis |
| 3,944,025 | A | | 3/1976 | Owen |
| 4,052,323 | A | | 10/1977 | Feneberger |
| 4,575,430 | A | | 3/1986 | Periard |
| 4,647,386 | A | | 3/1987 | Jamison |
| 4,659,762 | A | * | 4/1987 | Jenkins .................. 524/331 |
| 4,711,320 | A | | 12/1987 | Dombroski |
| 4,763,759 | A | | 8/1988 | Federico |
| 4,811,818 | A | | 3/1989 | Jamison |
| 4,915,856 | A | * | 4/1990 | Jamison .................. 508/103 |

(Continued)

FOREIGN PATENT DOCUMENTS

DE 29719861 1/1998

(Continued)

*Primary Examiner*—Ellen M McAvoy
(74) *Attorney, Agent, or Firm*—Stephen M. Nipper; Dykas, Shaver & Nipper, LLp

(57) ABSTRACT

A solid lubricant and composition useful for lubricating the flanges of locomotive wheels, railcar wheels, rail track and in applications where it is desirable to reduce friction when metal contacts metal. The solid lubricant having from about twenty-five percent to about seventy percent by volume of a polymeric carrier, about five to seventy-five percent by volume of organic and inorganic extreme pressure additives, about zero to twenty percent by volume synthetic extreme pressure anti-wear liquid oil, and about zero to one percent by volume optical brightener.

14 Claims, 6 Drawing Sheets

U.S. PATENT DOCUMENTS

| | | |
|---|---|---|
| 5,076,339 A | 12/1991 | Smith |
| 5,173,204 A | 12/1992 | Chiddick |
| 5,308,516 A | 5/1994 | Chiddick |
| 5,337,860 A | 8/1994 | Burke |
| 5,435,925 A | 7/1995 | Jamison |
| 5,668,091 A | 9/1997 | Grinham |
| 6,182,793 B1 | 2/2001 | Jamison |
| 6,649,573 B2* | 11/2003 | Mitrovich ............... 508/131 |
| 6,855,673 B2* | 2/2005 | Cotter et al. ............ 508/143 |
| 7,045,489 B2* | 5/2006 | Cotter et al. ............ 508/143 |
| 7,244,695 B2* | 7/2007 | Eadie ..................... 508/143 |
| 2007/0135315 A1* | 6/2007 | Mitrovich ............... 508/100 |
| 2008/0182766 A1* | 7/2008 | Cotter et al. ............ 508/125 |
| 2008/0220997 A1* | 9/2008 | Eadie et al. ............. 508/113 |

FOREIGN PATENT DOCUMENTS

| | | |
|---|---|---|
| EP | 0469906 | 2/1992 |
| EP | 0590959 | 4/1994 |
| EP | 0774488 | 5/1997 |
| GB | 2207146 | 1/1989 |
| GB | 2223504 | 4/1990 |
| GB | PCT/GB90/00878 | 4/1997 |
| WO | WO 90/15123 | 12/1990 |

* cited by examiner

SOLID LUBRICANT STICKS HAVING A TWO PART FORMULATION

PRIORITY

This application claims priority from a co-pending application entitled "Environmentally friendly solid lubricant sticks" filed by Michael J. Mitrovich on Dec. 05, 2005, having Ser. No. 11/295,711, which claimed priority from a provisional application entitled "Environmentally friendly solid lubricant sticks", filed by Michael J. Mitrovich on Dec. 03, 2004, having Ser. No. 60/633,279. Application Ser. No. 11/295,711 claims priority of application entitled "Solid Lubricant and Composition" filed by Michael J. Mitrovich on Sep. 03, 2003, having Ser. No. 10/655,082 (now abandoned), which claimed priority from an application entitled "Solid Lubricant and Composition" filed by Michael J. Mitrovich on Apr. 11, 2002, having Ser. No. 10/123,001 (now U.S. Pat. No. 6,649,573), which itself claimed priority from a provisional application entitled "Solid Lubricant and Composition" filed by Michael J. Mitrovich filed on Apr. 13, 2001, having Ser. No. 60/283,869 (now abandoned), the disclosures of which are all incorporated herein by reference.

BACKGROUND OF THE INVENTION

For over fifty years, heavy haul railroads have used a variety of methods to reduce friction between the locomotive and railcar wheel flanges and the gauge face of the rail with which it comes in contact with. Railroads and transits have realized they can save substantial amounts of money in lowered maintenance and equipment replacements if lubrication is applied. Several methods have been used including one method wherein hundreds of wayside lubricators eject hydrocarbon petroleum based lubricants onto the gauge face of the rail as the train travels through a curve. A second method for applying lubricant has been to use track inspection trucks to spray petroleum or synthetic grease onto the gauge face of the track as the inspection truck goes through a curve. A third method is to apply lubricant to the wheel flange of the locomotive whereupon the lubricant gets transferred from the wheel flange of the locomotive to the wheel flange of railcars. Lubricant is then passed back through the train as successive wheels come in contact with the rail and pick up some of the lubricant.

These types of lubrication are typically accomplished by spray devices that squirt small amounts of lubricating oil onto wheel flanges. There are inherent problems with the above-described methods of applying lubricant. First, sprayed oil has a tendency to migrate to the tread of the wheel, making it more difficult for the train to stop. Also, grease and oil on top of the rail can cause the train wheels to slip inhibiting the ability of the brakes of the train to slow or stop the train. In addition, grease and oil on top of the rail can make it difficult for the train to gain traction from a stopped position or when climbing an incline. Secondly, to keep oil spray devices in working order has required excessive maintenance time and expense.

An alternative method for overcoming problems with spraying oil onto the wheel flange of the locomotive or railcar has been to use a solid lubricant stick or rod. The stick or rod is inserted into a tube that is then applied by various mechanical means to the flanges of the wheel of a locomotive or railcar.

Prior art solid lubricants also have several inherent problems. First, prior art lubricant sticks contain graphite or molybdenum powders because of their anti-wear properties. These prior art molybdenum disulfide compound sticks were made without polymers whereby the molybdenum disulfide was smashed together in a foil wrapper. However, this made the lubricant stick very hard and brittle, so that they could not withstand a rugged locomotive or railcar environment and the sticks would break or disappear.

Prior art solid lubricant stick compositions also have used polymeric carriers to provide durability, but have also included materials that do not provide extreme pressure anti-wear protection or are potentially hazardous to the environment. In some prior art, the sticks have promoted the ability to lubricate a particular wheel flange, but because they have not contained additives to withstand the extreme pressure of a locomotive or railcar flange against the track, the lubricant has not transferred throughout the train. In other prior art, the solid lubricant has lubricated throughout the train, but these formulas contain undesirable hazardous metallic powders, because of their anti-wear capabilities, but the metallic powders not only pollute the environment, but also may be hazardous to railroad workers.

U.S. Pat. No. 3,537,819 to Davis et al., discloses that the characteristics of the solid lubricant such as hardness, deposition, and rigidity are dependant on the molecular weight and the amount of high molecular weight polyethylene that is used.

U.S. Pat. No. 3,541,011 to Davis et al., also discloses a solid lubricant whereby the characteristics of the lubricant such as hardness, deposition, and rigidity are dependent on the molecular weight and on the amount used of high molecular weight polyethylene.

U.S. Pat. No. 3,729,415 to Davis et al., discloses a combination of polyethylene and hydrocarbon oil in a stick lubricant that does not contain extreme anti-wear materials to prevent excessive wear.

U.S. Pat. No. 4,915,856 to Jamison, discloses an alternative solid polymeric stick formula, which includes lead and other metallic powder, in either single or co-extruded compositions. While the metallic powder offers anti-wear properties, it also can pollute the environment, such as ground water, when it drops alongside and also can present hazardous conditions for rail workers. Inclusion of metallic powders that may be considered hazardous by the E.P.A. is undesirable to railroads and transits.

SUMMARY OF THE INVENTION

In order to overcome problems inherent in the prior art there has been devised by the present invention a solid lubricant and composition useful for lubricating the flanges of locomotive wheels, railcar wheels, rail track, and in applications where it is desirable to reduce friction when metal contacts metal. The solid lubricant of the present invention comprises from about twenty-five percent to about seventy percent by volume of a polymeric carrier, and in combination about five to seventy-five percent by volume of organic and inorganic extreme pressure additives, including an organic and inorganic powder lubricant and optionally a synthetic extreme pressure anti-wear liquid oil and/or an optical brightener so that the lubricant can be seen under black light conditions to allow verification that the lubricant is coating the surface to which it is applied.

In the preferred embodiment, the solid lubricant composition comprises two portions, namely a first portion and a second portion. The first portion of the lubricant stick is composed generally of the following formula one: from about twenty-five percent to about seventy percent by volume (preferably from about thirty-five percent to about thirty-nine percent) of a polymeric carrier with a relatively high melt index, such as a linear low density polyethylene, a low density polyethylene, a polyolefin or a synthetic wax; from about five percent to about seventy-five percent by volume (preferably about sixty percent) of organic and inorganic powder; from about zero percent to about twenty percent by volume (preferably about one percent to about four percent) of a synthetic extreme pressure anti-wear oil; and from about zero percent to about one percent by volume (preferably about one percent) of an optical brightener. The second portion of the lubricant stick is composed generally of the following formula two: from about twenty-five percent to about seventy percent by volume (preferably about twenty-nine percent) of linear high density polyethylene polymeric carrier with a relatively low melt index; from about five percent to about seventy-five percent by volume (preferably about sixty-five percent) of organic and inorganic powder; from about zero percent to about twenty percent by volume (preferably about five percent) of a synthetic extreme pressure anti-wear oil; and from about zero percent to about one percent by volume (preferably about one percent) of an optical brightener.

The solid lubricant of the present invention uses two distinct thermo-polymer resins with different melt flow temperatures and melt point indexes to form a two portion lubricant. The first portion of applied lubricant is rapidly penetrated into a metallic surface when lubricant is first applied to a metallic surface. The second portion of the lubricant is applied more slowly, when less is needed.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the drawings and description of the preferred embodiment are to be regarded as illustrative in nature, and not as restrictive.

DESCRIPTION OF THE PREFERRED EMBODIMENT

Figure 1:
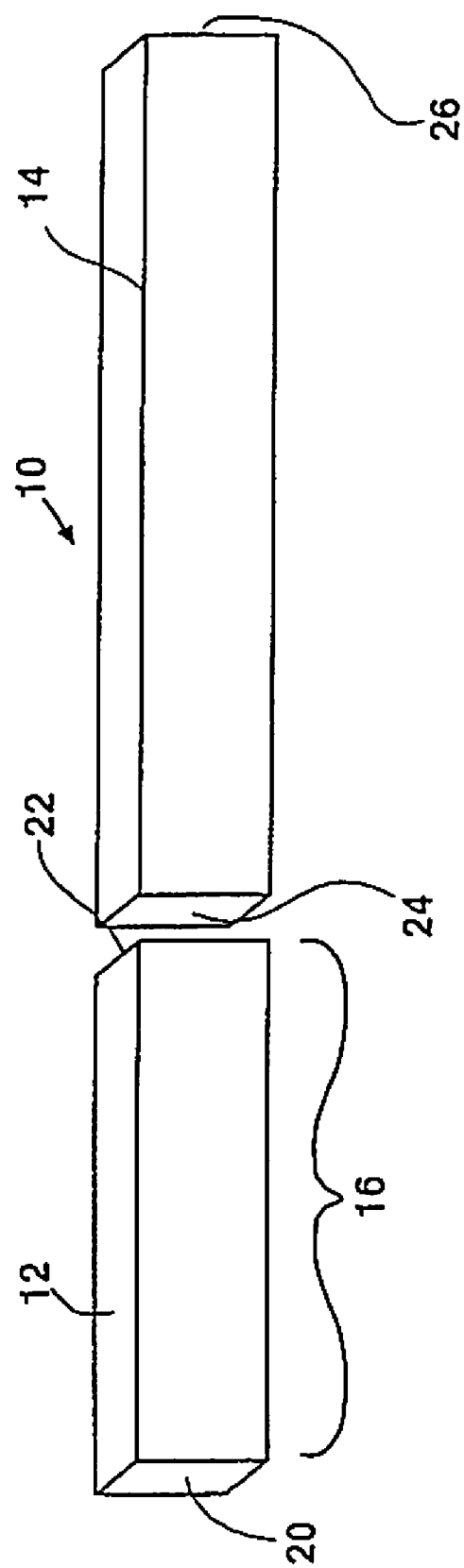
FIG. 1 is a perspective view of the two portions of the solid lubricant stick of the present invention.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, alternative uses, and equivalents falling within the spirit and scope of the invention as defined in the claims.

Referring now to the drawings in general and to FIG. 1 of the drawings in particular, there is shown a perspective view of the two portions of the solid lubricant stick of the present invention. The lubricant stick of the present invention is shown generally by the number 10. It can be seen in FIG. 1 that the lubricant stick 10 of the present invention starts out as two separate portions (12, 14) having two distinct formulations.

The first portion 12 of the lubricant stick 10 is composed generally of the following formula one: from about twenty-five percent to about seventy percent by volume of a polymeric carrier with a relatively high melt index, such as a linear low density polyethylene, a low density polyethylene, a polyolefin or a synthetic wax; from about five percent to about seventy-five percent by volume of organic and inorganic powder; from about zero percent to about twenty percent by volume of a synthetic extreme pressure anti-wear oil; and from about zero percent to about one percent by volume of an optical brightener.

In the preferred embodiment, the polymeric carrier is either a linear low density or low polyethylene, however, synthetic waxes with a low melt flow temperature of less than two hundred fifty degrees Fahrenheit can also be used. If a synthetic wax polymeric carrier is used instead of a linear low or low density polyethylene polymeric carrier, the melt flow temperature for the synthetic wax polymeric carrier in formula one is from about fifteen to two hundred, with a melt flow temperature between about two hundred and three hundred degrees Fahrenheit. If the polymeric carrier is either a linear low density or low density polyethylene with a relatively high melt index, the melt index of the polymeric carrier is generally from about ten to sixty and the melt flow temperature is generally lower between about three hundred and three hundred and fifty degrees Fahrenheit.

This polymeric carrier which is mixed with organic and inorganic anti-wear powders is from the polyolefin family and can be used in either of two forms. The polymeric carrier can be either a powder or pellet form, wherein the pellets are usually between 0.1 and 0.15 inch and are irregularly shaped, or in a ball, cylinder, or hexagon shape.

In the preferred embodiment, the first portion 12 of the lubricant stick 10 uses about sixty-five percent organic and inorganic powder by volume, coming from a combination of about fifty percent molybdenum disulfide powder, about ten percent graphite powder, and one to four percent by volume of synthetic extreme pressure anti-wear liquid oil and about one percent optical brightener. Other combinations of these and other ingredients will be obvious to one skilled in the art and the above formulation is given by way of illustration only. For example, the percentage of polymeric carriers used can vary according to how quickly or slowly the desired deposition of the solid lubricant is against a steel surface. The percentage of inorganic powder can vary depending on how much organic powder is used and the percentage of organic powder used can vary depending on how much inorganic powder is used.

It is also not necessary to use any extreme pressure anti-wear liquid oil or the amount of liquid oil used could be increased to from about five percent by volume to about twenty percent by volume of the composition. More than one type of liquid oil can be used and the percentage used can be varied depending on the percentage of inorganic or organic powders used. The percentage of liquid oil can also be varied depending on the percentage of liquid oil or oils needed for blending of the dry powdered materials.

The addition of an optical brightener is also not required, but is used only so that by using a black light, the lubricant deposition on wheel flanges or rail track can be verified.

In general, the first portion 12 of the lubricant stick 10, as seen in FIG. 1, is made of a lower melt flow temperature and higher melt index polymeric carrier than the second portion 14 of the lubricant stick 10. The first portion 12 of the lubricant stick 10 has these characteristics so that it is rapidly penetrated into a metallic surface. In the embodiment shown in FIG. 1, the first portion 12 of the lubricant stick 10 generally comprises about one-third of the total length of the lubricant stick 10, so that an appropriate amount of lubricant is absorbed into the metallic surface when the lubricant is first applied. However, this dimension is easily varied and the present invention is not to be limited to this proportion.

In FIG. 1, it can further be seen that the lubricant stick 10 of the present invention also has a second portion 14. The second portion 14 of the lubricating stick 10 is composed of a different formula than the first portion 12, with that formula, formula two, generally being the following: from about twenty-five percent to about seventy percent by volume of linear high density polyethylene polymeric carrier with a relatively low melt index; from about five percent to about seventy-five percent by volume of organic and inorganic powder; from about zero percent to about twenty percent by volume of a synthetic extreme pressure anti-wear oil; and from about zero percent to about one percent by volume of an optical brightener.

In the formulation of the second portion 14 of the lubricant stick 10, the organic and inorganic powder is preferably the same as is used in the first portion 12 of the lubricant stick 10. The difference in the formulation of the second portion 14 of the lubricant stick 10 is that the second portion 14 has a higher melt flow temperature and a lower melt index of the polymeric carrier than does the first portion 12. In formula two, the polymeric carrier can be a linear high-density polyethylene, a high-density polyethylene, a high-density polypropylene or a high-density methylpentene.

In the preferred embodiment, a high density polyethylene is used as the polymeric carrier in formula two with a generally low melt index of about five or less. More particularly, the melt index is usually between about 0.1 and 1.0. The melt flow temperature is generally higher, between about three hundred fifty and four hundred degrees Fahrenheit. If a polypropylene is used instead, the melt index range is between about thirty and fifty and the melt flow temperature is between about four hundred and four hundred eighty degrees Fahrenheit. If methylpentene is used as the polymeric carrier, the melt index is between twenty and one hundred eighty and the melt flow temperature is between about five hundred and five hundred fifty degrees Fahrenheit. As with the variations described with reference to formula one, it is also within the spirit and scope of the present invention to vary the percentages and ingredients used in formula two. The above formulation is given by way of illustration only.

The organic and inorganic powder used in the second formula formulations is used as an anti-wear additive. In its preferred embodiment, it contains a minimum of about sixty-five percent by volume of inorganic molybdenum disulfide powder, graphite powder, talc powder, mica powder, or calcium carbonate powder. The significant percentage of these extreme pressure anti-wear powders provides the lubrication necessary to prevent excessive wear due to rolling and sliding contact between wheel flanges of a locomotive and rail track.

The synthetic liquid oil in the formulation of the present lubricant stick 10 also acts as an extreme pressure anti-wear additive. The synthetic liquid oil is a biodegradable mineral-based oil that assists in the blending of the polymeric carrier and the extreme pressure anti-wear powders. A ratio of about four parts per hundred to about fifteen parts per hundred of the synthetic oil can be used. In the preferred embodiment, about five percent by volume of synthetic oil in the formulation is the most effective. Less than four percent of synthetic oil by volume in the formulation is not sufficient to contribute to the mixing of the anti-wear powders and the polymeric resin of the polymeric carrier.

In the preferred embodiment, optical brightener is added to both the formulations. As previously indicated, optical brightener allows the lubricant of the present invention to be seen under black light conditions. The optical brightener therefore verifies that the solid lubricant 10 is coating the surface to which it is being applied. About one percent by volume of optical brightener is preferred in the formulation to ensure visibility, however, zero to about one percent by volume may be utilized.

Figure 2:
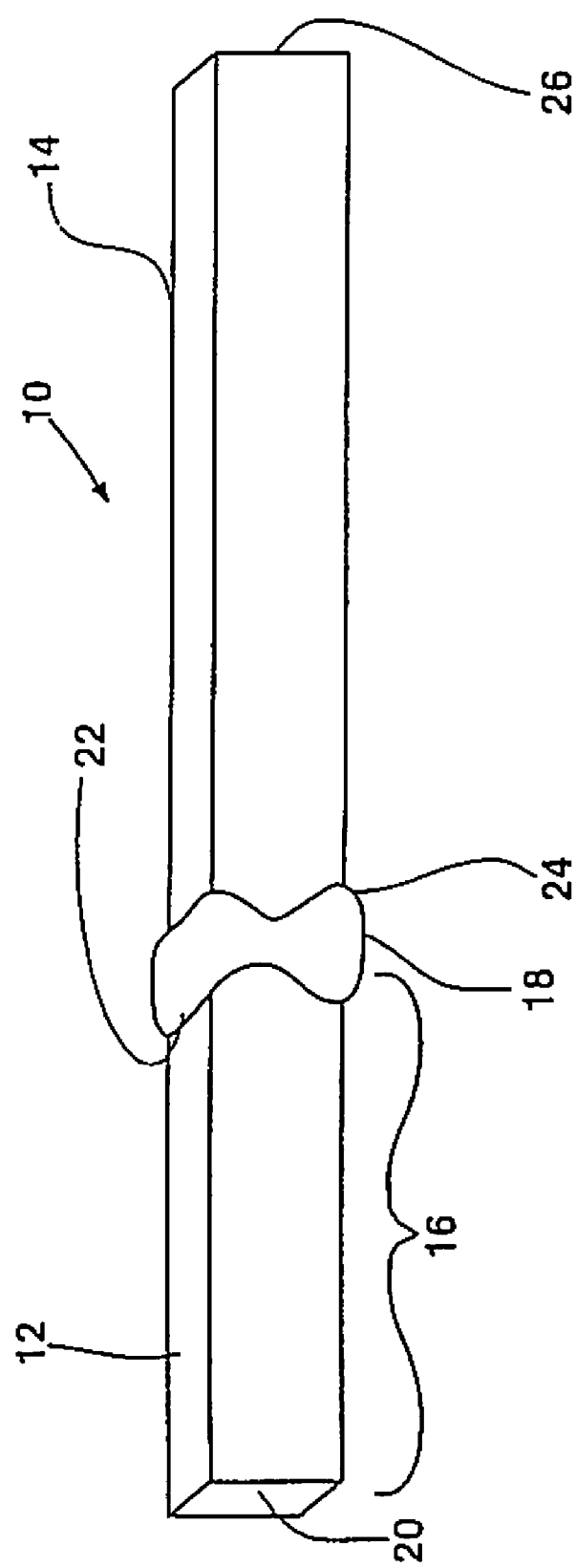
FIG. 2 is a perspective view of the two portions of the solid lubricant stick of the present invention showing how the two portions are welded together to form a one piece lubricant stick.

The solid lubricant stick 10 of the present invention uses the two formulas combined in the single lubricant stick, one example of which can be seen in FIG. 2. This single lubricant stick having two distinct thermo-polymeric resins with distinctly different melt flow temperatures and melt point indices, so that the rate at which the lubricant is applied and absorbed can be varied. When the thermo-polymeric lubricant is first applied to the metallic surface, more lubricant is needed because the metallic surface has no lubrication and is most vulnerable to excessive wear. The first applied lubricant from the first portion 12 of the lubricant stick 10 is made of the lower melt flow temperature and the higher melt index polymeric carrier and is rapidly penetrated into the metallic surface to which it is applied thereby substantially reducing the coefficient of friction between two metallic surfaces in contact.

The second applied lubricant that is in the second portion 14 of the same lubricant stick 10 has a higher melt flow temperature and a lower melt index. After a coating of lubrication has been established by the first portion 12 of the lubricant stick 10, less of the lubricant is needed to maintain a low coefficient of friction. Thus, the lower melt flow and higher melt index polymer of the first portion 12 of the lubricant stick 10 is no longer needed and would be wasted if applied.

As the lower melt flow temperature and higher melt index polymer is needed and used at a slower rate, the second portion 14 of the lubricant stick 10 is used with the higher melt flow temperature and lower melt index, the second portion 14 of the lubricant stick 10 acts as a maintenance material to provide continuous lubrication. In the preferred embodiment, approximately the first third 16 of lubricant stick 10 is made up of the first formula with the higher melt flow temperature and lower melt index, with the other two-thirds comprising the second formula. After the first portion 12 of the lubricant stick 10 has been used to substantially lubricate a dry wheel flange and gauge side of a rail track, the first portion 12 is no longer on the lubricant stick 10 and the second portion 14 is then used to provide lubricating maintenance to the flanges of the wheel of the locomotive and gauge side of the rail track.

Referring now to FIG. 2 of the drawings, shown is a perspective view of one embodiment of the solid lubricant stick 10 showing how the two portions 12 and 14 are welded together to form a one piece lubricant stick 10. It can be seen in FIG. 2 that the first portion 12 of the lubricant stick 10 is welded to the second portion 14 of the lubricant stick 10 with a double "v" butt weld 18. It is within the spirit and scope of the invention to use other weld formations, and the "v" butt weld 18 of FIG. 2 is used only as an example of a way to weld the two portions 12 and 14 together. It can be seen in FIGS. 1 and 2 that the first portion 12 of the lubricant stick 10 has a first end 20 and a second end 22. Similarly, the second portion 14 of the lubricant stick 10 has a first end 24 and a second end 26. The second end 22 of the first portion 12 of the lubricant stick 10 is welded to the first end 24 of the second portion 14 of the lubricant stick 10 so that a single width lubricant stick 10 is formed.

There is a four-step process of producing the lubricating stick 10 having two portions 12 and 14. First, all materials for the first formula in the first portion 12 are blended and extruded into pellet size shapes. It is however, not necessary to pelletize the ingredients first. For instance, they can be mixed together very well with a heavy duty mixer that confines dust or any other manner of pelletizing the ingredients that keeps dust from flying freely. Second, all materials for the second formula in the second portion 14 are blended and extruded into pellet size shapes or mixed in a heavy-duty mixer like the first formula. Third, a desired shape of each of the portions 12 and 14 of the solid lubricant stick 10 are made using extrusion, transfer molding, or injection molding. Fourth, the two shapes from step three are welded together to form a single lubricant stick 10. The two portions 12 and 14 can be joined together in any common means, including through use of extrusion welding, hot air welding, or inject welding. Additionally, the two portions could be co-extruded together.

There are several methods that can be used to join the two portions 12 and 14 of the lubricating stick 10 of the present invention together. One such method is hot air welding, which utilizes hot air to heat the thermoplastic polymeric material. In this method, a hot air welder is held in one hand and a welding rod is held in the other hand. Welding material is applied between the two portions 12 and 14 and when the thermoplastic polymeric material cools, the two portions 12 and 14 are joined together as one piece. Another form of hot air welding uses steel paddles coated with Teflon®. The paddles are heated on both sides and the second end 22 of the first portion 12 and the first end 24 of the second portion 14 of the lubricant stick 10 are pressed against the paddles. When the thermoplastic polymeric material begins to soften, the heated end 22 of the first portion 12 is butted against the heated end 24 of the second portion 14.

Another method of joining two portions 12 and 14 of the lubricating stick 10 together is by high speed welding. In high speed welding, a first tacking tip is used to clean and prepare the ends 22 and 24 of the portions 12 and 14 to be attached to each other. Then, a high speed welding tip having a feeding channel is used to join the two portion ends 22 and 24, such that a welder does not need to hold a welding rod in his hand.

Another method joining two portions 12 and 14 together called injectiwelding uses heat from the welding tip to preplasticize the welding surface of the thermoplastic polymeric material. Molten plastic is injected under pressure below the surface of the thermoplastic polymeric material and into the weld areas thereby fusing the plastic together to form a solid weld. With injectiweld, because the orifice in the weld tip is submerged, surface preparation is not necessary.

Another method of joining two portions 12 and 14 of a solid lubricant stick 10 together is the extruded welding process. In this process, a continuous flow of extruded material that is used to join the two ends 22 and 24 of the two portions 12 and 14 of the solid lubricant stick 10 is pressed onto the welding surface. The extruder forces the joining material onto the ends 22 and 24 of the two portions 12 and 14.

Another method of joining two portions 12 and 14 of a solid lubricant stick 10 together is through co-extrusion. Co-extrusion is the simultaneous extrusion of the first portion and the second portion through a single die.

Figure 3:
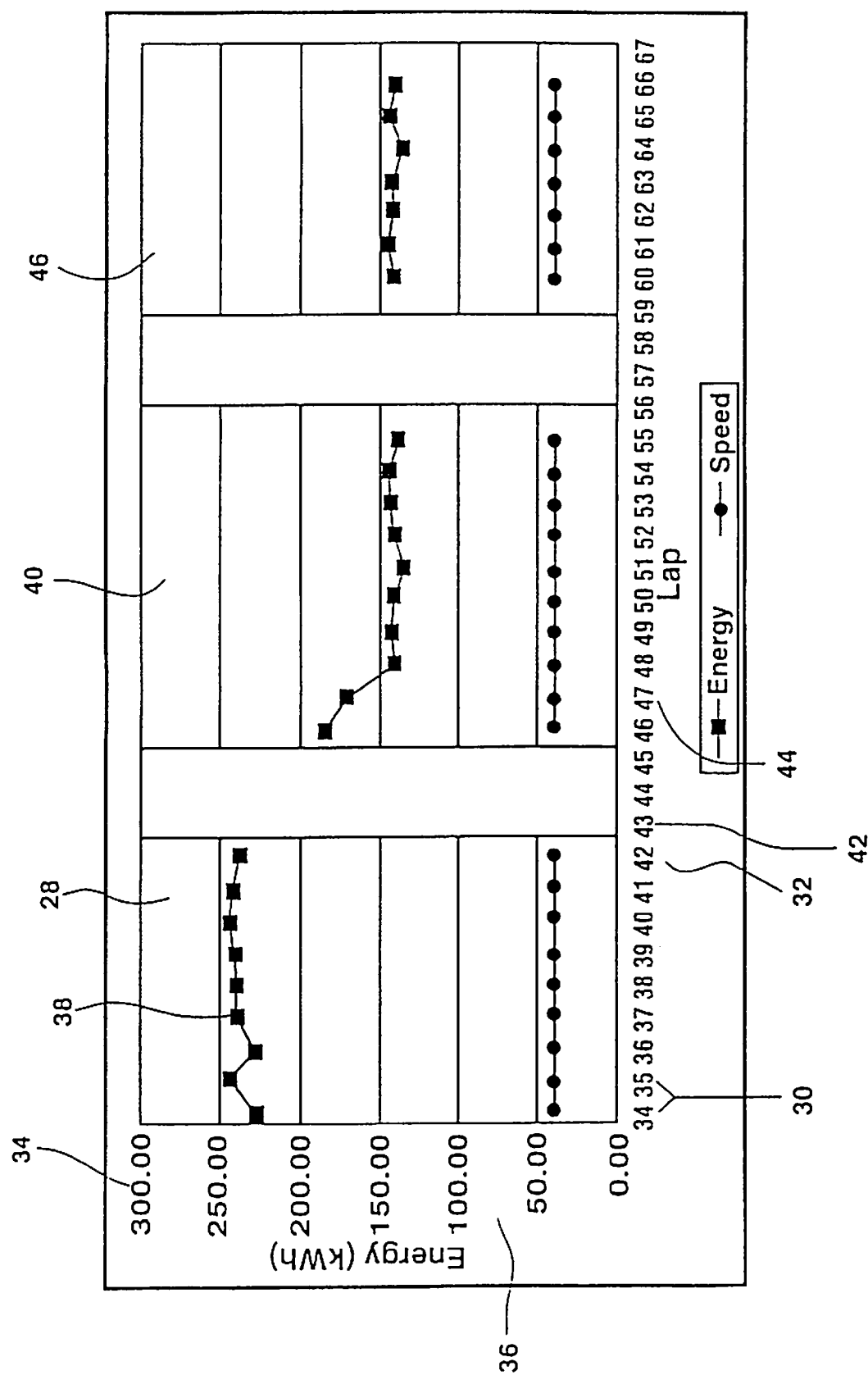
FIG. 3 is a graph showing the reduced mechanical energy needed for a locomotive to go through a single lap having its wheel flanges lubricated with the present solid lubricant stick versus having dry wheel flanges.

Referring now to FIG. 3 of the drawings, a graph shows the reduced mechanical energy needed for a locomotive to go through a single lap having its wheel flanges lubricated with the present solid lubricant stick versus having dry wheel flanges. In FIG. 3, it can be seen that there is about a forty percent average reduction in the mechanical energy needed for a train to travel around a test loop after the solid lubricant stick 10 of the present invention has been applied to locomotive wheel flanges.

There are three sections in FIG. 3. The first section 28 of FIG. 3 shows a lap number 30 along an x-axis 32 and the mechanical energy in kWh 34 along the y-axis 36. In the first section 28 of FIG. 3, the dry baseline 38 is shown for laps 34-42. During these laps, the average mechanical energy expended by a locomotive was 241.74 kWh. After the solid lubricant sticks 10 of the present invention were applied to the wheel flanges of a locomotive, starting at lap 43, the mechanical energy expended showed an immediate drop once the train was at test speed, as seen in the second section 40 of FIG. 3. By the fourth lap, after lubrication 44, the energy readings had dropped to what was established as the approximate steady state condition, 144.3 kWh. The third section 46 of FIG,. 3 shows that for laps 60-66, the average steady state lubrication was maintained for an average mechanical energy savings of thirty-nine and nine tenths percent.

Figure 4:
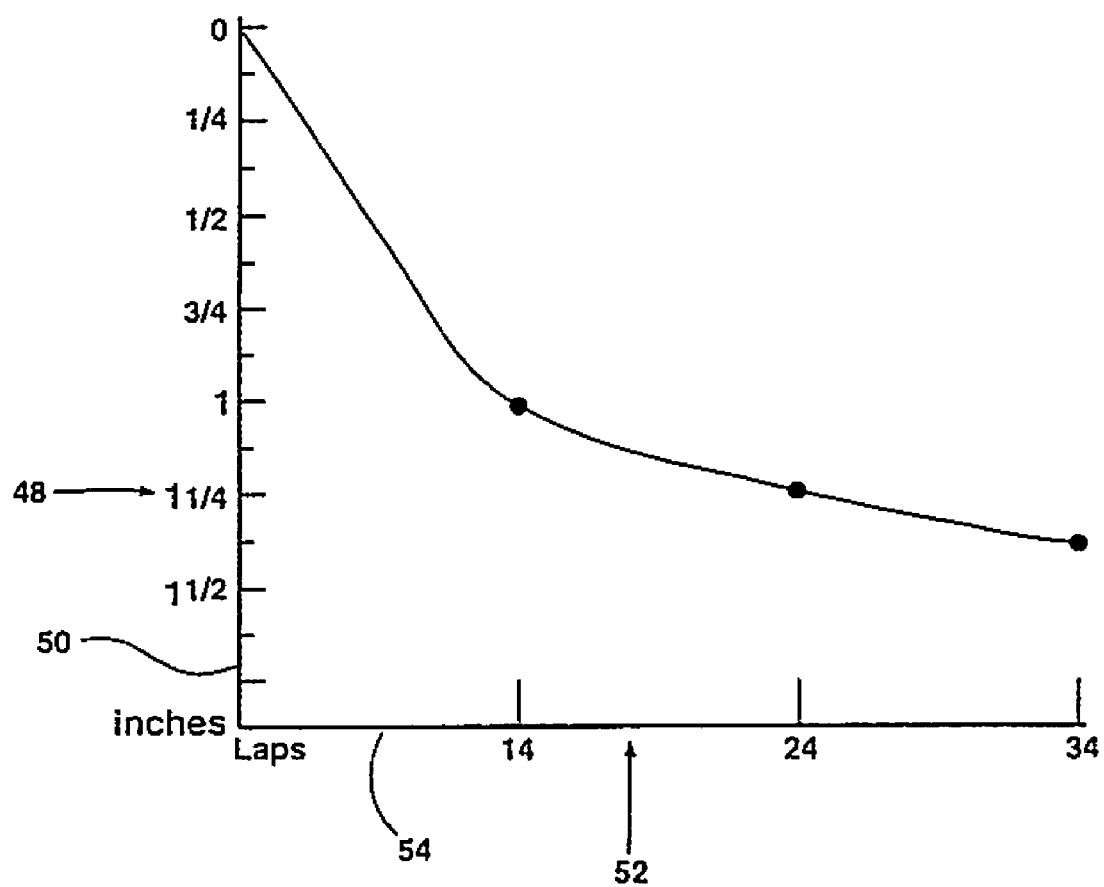
FIG. 4 is a graph showing the wear on a solid lubricant stick of the present invention first on dry wheel flanges and after the train has reached a steady state of lubrication.

Referring now to FIG. 4 of the drawings, a graph shows the wear on a solid lubricant stick 10 of the present invention, as seen in FIG. 2, first on dry wheel flanges and then after the train has reached a steady state of lubrication. In FIG. 4, the consumption rate 48 (wear) in inches of the lubricant stick 10, in FIG. 2, is shown along the y-axis 50 and the number of laps 52 is shown along the x-axis 54. Thus, FIG. 4 shows how much of the solid lubricant stick 10 has been consumed after thirty-four laps around a track. FIG. 4 shows that as the train becomes lubricated with the solid lubricant stick 10, less of the lubricant is needed to maintain the reduction in energy necessary to operate the train.

Figure 5:
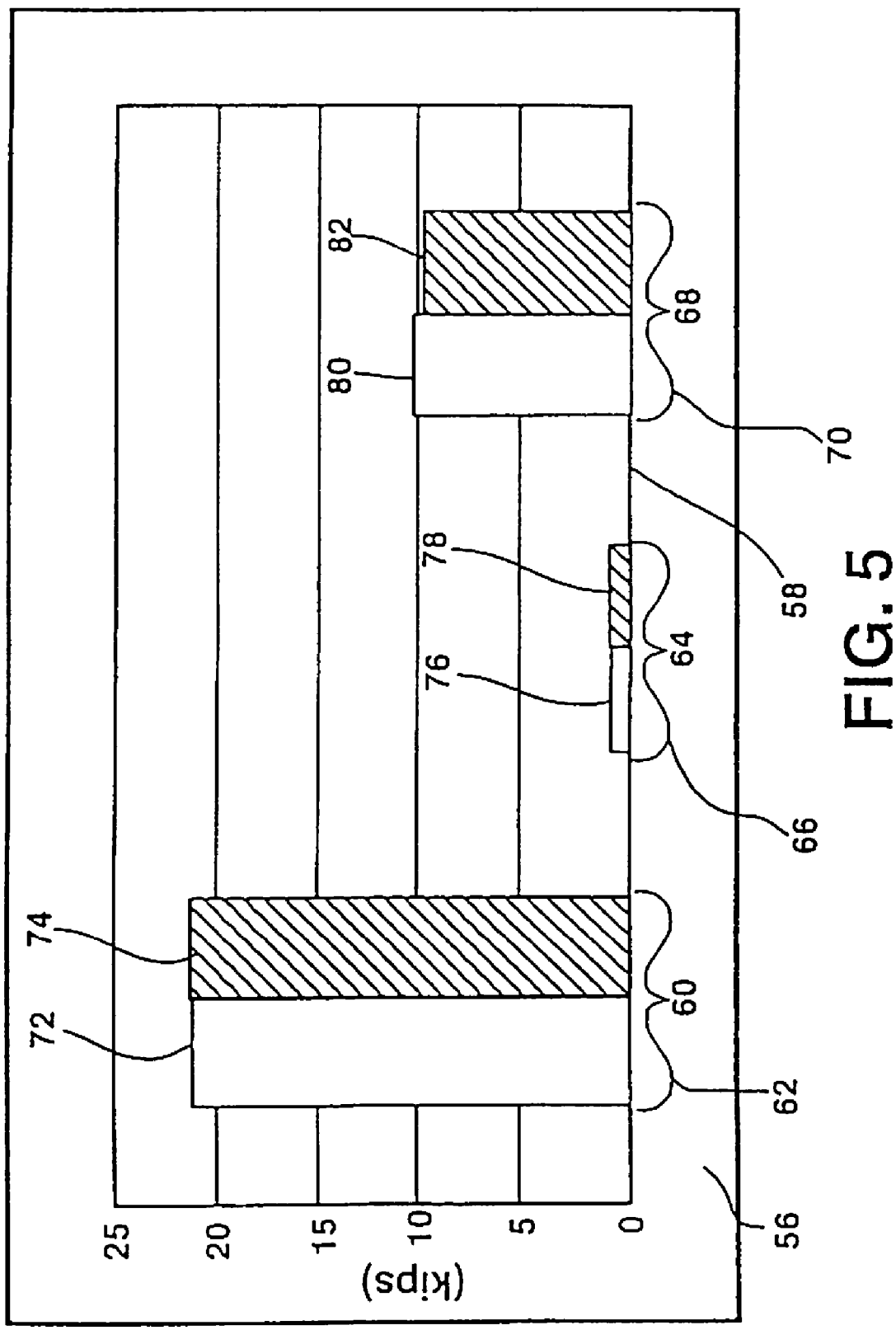
FIG. 5 is a graph showing the effect on lateral forces for a dry inside rail versus a lubricated inside rail, lubricated by means of the present solid lubricant stick. No significant effect on lateral sources indicates that the lubricant was not migrating to the top of the rail.

Referring now to FIG. 5 of the drawings, a graph shows the effect on lateral forces for a dry inside rail versus an inside rail lubricated by means of the present solid lubricant stick. The inside and outside rail referred to in the discussion of FIGS. 5 and 6 refer to the position of the rail in a curve. When there is no migration of the lubricant to the tread of the wheel of a service truck or to the top of rail (either on the inside or outside), the lubricant does not effect how the truck or wheels adhere to the rail throughout a curve.

In FIG. 5, lateral load force units called kips are measured along the y-axis 56. The x-axis 58 represents the first pair of columns 60, the maximum lateral load force 62, and in the third pair of columns 68, the average lateral load force 70.

Each pair of columns 60, 64, and 68 is divided into two sections. The first pair of columns 60 has a first section 72 and a second section 74. So, the first section 72 of the first pair of columns 60 shows the maximum lateral load force 62 under dry conditions and the second section 74 of the first pair of columns 60 shows the maximum lateral load force 62 after lubrication with the present lubricant stick 10.

In a similar manner, the second pair of columns 64 in FIG. 5 have a first section 76 and a second section 78. The first section 76 represents the minimum lateral load force 66 under dry conditions and the second section 78 of the second pair of columns 64 represents the minimum lateral load force 66 after lubrication with the present lubricant stick 10. The third pair of columns 68 has a first section 80 and a second section 82. The first section 80 of the third pair of columns 68 represents the average lateral load force 70 under dry conditions and the second section 82 of the third pair of columns 68 represents the average lateral load force 70 after lubrication with the present lubricant stick 10. It can be seen, therefore, in FIG. 5, that there is very little change between lateral load forces under dry conditions on an inside rail versus after lubrication on an inside rail with the present lubricant stick 10. No significant effect on the lateral load forces indicate that the lubricant of the lubricant stick 10 was not migrating to the top of the inside rail.

Figure 6:
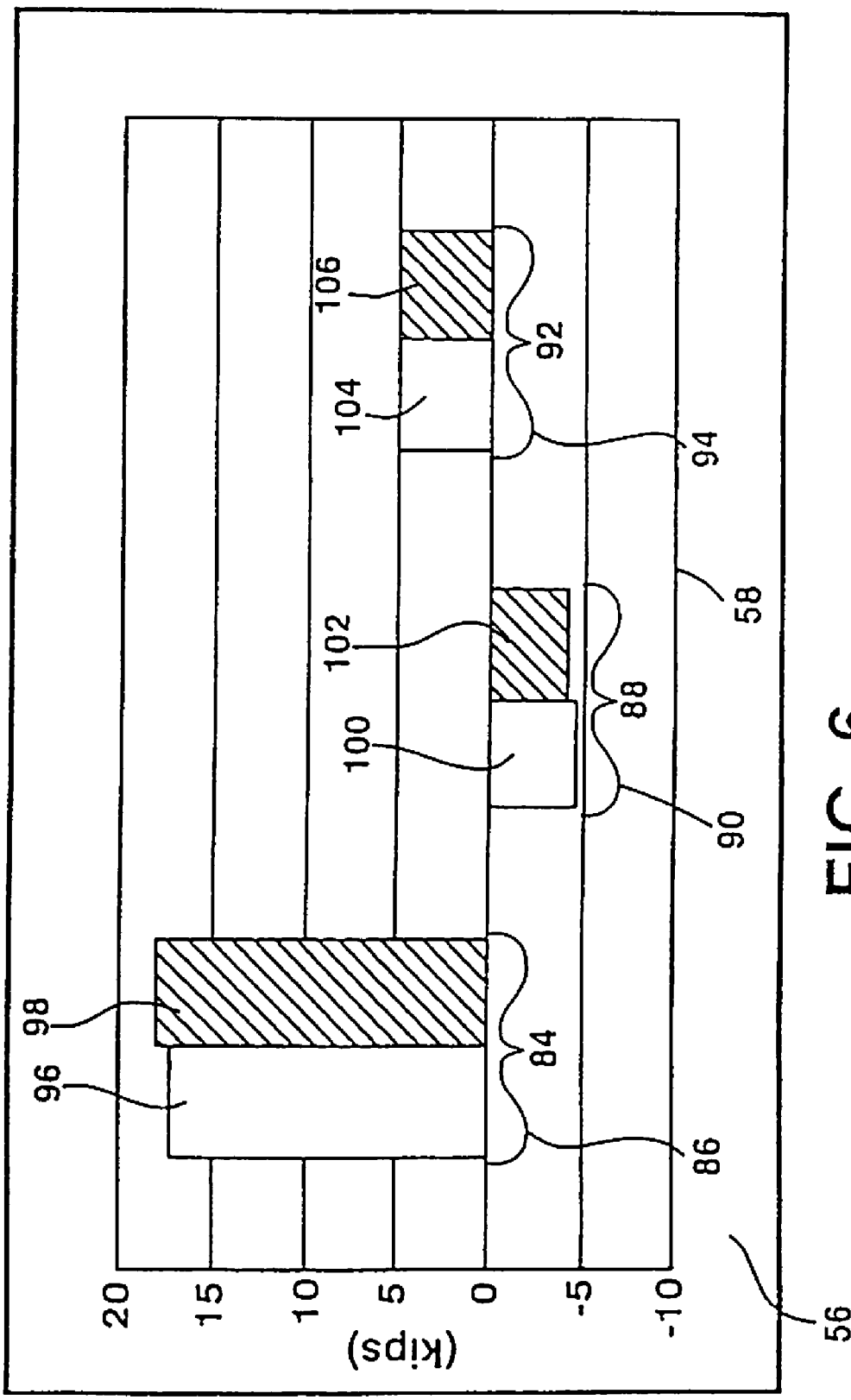
FIG. 6 is a graph showing the effect on lateral forces for a dry outside rail versus a lubricated outside rail, lubricated by means of the present solid lubricant stick. Also, in FIG. 6 it can be seen that there is no significant effect on lateral sources indicating that the lubricant was not migrating to the top of the rail.

Referring now to FIG. 6, there is a graph showing the effect on lateral forces for a dry outside rail versus an outside rail lubricated by means of the present solid lubricant stick 10. In FIG. 6, it also can be seen that there is no significant effect on lateral load forces indicating that the lubricant was not migrating to the top of the outside rail. FIG. 6 is similar to FIG. 5, except instead of showing the effect on lateral forces on an inside rail, FIG. 6 shows the same data for an outside rail.

In FIG. 6, lateral load force units (kips) are measured along the y-axis 56 and the x-axis 58 represents lateral load force. The figure shows, in the first pair of columns 84 the maximum lateral force 86, in the second pair of columns 88 the minimum lateral load force 90, and in the third pair of columns 92 the average lateral load force 94. Like FIG. 5, in FIG. 6, each pair of columns 84, 88, and 92 are divided into two sections. The first pair of columns 84 has a first section 96 representing the dry conditions and a second section 98 representing the lubricated conditions. The second pair of columns 88 has a first section 100 representing dry conditions and a second section 102 representing lubricated conditions. The third pair of columns 92 has a first section 104 representing dry conditions and a second section 106 representing lubricated conditions.

It can be seen, therefore, in FIG. 6, that with maximum lateral load force 86, minimum lateral load force 90, and average lateral load force 94, there is no significant change in lateral load forces under dry conditions on an outside rail versus after lubrication on an outside rail with the present lubricant stick 10. So, in FIG. 6, no significant effect on the lateral load forces indicates also that the lubricant of the lubricant stick 10 of the present invention was not migrating to the top of the outside rail.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

I claim:

1. A solid lubricant for lubricating a railcar wheel flange, said lubricant formulated to vary the rate at which the lubricant is applied and absorbed, said lubricant comprising:
   a first portion comprising a first polymeric carrier;
   a second portion comprising a second polymeric carrier;
   said first polymeric carrier having a lower melt flow temperature than said second polymeric carrier;
   said first polymeric carrier having a higher melt index than said second polymeric carrier; and
   said first portion fixedly attached to said second portion, said attachment configured so as to enable said first portion to be consumed through application to a surface before said second portion is consumed through application to a surface.

2. The solid lubricant of claim 1, wherein said first portion is one-third the quantity of said second portion.

3. The solid lubricant of claim 1, wherein said solid lubricant is formed into a generally parallelepipedal stick.

4. The solid lubricant of claim 1, wherein said attachment of said first portion to said second portion is accomplished by a process from the group consisting of:
   welding by a double V butt weld, co-extrusion, hot air welding, high speed welding, injectiwelding, and extrusion welding.

5. The solid lubricant of claim 1, wherein said first portion comprises:
   (a) from about 25% to about 70% by volume of said first polymeric carrier;
   (b) from about 5% to about 75% by volume of at least one first lubricant powder;
   (c) from about 0% to about 20% by volume of a at least one synthetic extreme pressure anti-wear liquid oil; and
   (d) from about 0% to about 1% by volume of a least one optical brightener.

6. The solid lubricant of claim 1, wherein said second portion comprises:
   (a) from about 25% to about 70% by volume of said second polymeric carrier;
   (b) from about 5% to about 75% by volume of at least one second lubricant powder;
   (c) from about 0% to about 20% by volume of at least one synthetic extreme pressure anti-wear liquid oil; and
   (d) from about 0% to about 1% by volume of at least one optical brightener.

7. The solid lubricant of claim 1, wherein said first portion comprises:
   (a) from about 25% to about 70% by volume of said first polymeric carrier,
   (b) from about 5% to about 75% by volume of at least one first lubricant powder,
   (c) from about 0% to about 20% by volume of a at least one synthetic extreme pressure anti-wear liquid oil, and (d) from about 0% to about 1% by volume of a least one optical brightener; and wherein said second portion comprises:
   (e) from about 25% to about 70% by volume of said second polymeric carrier,
   (f) from about 5% to about 75% by volume of at least one second lubricant powder,
   (g) from about 0% to about 20% by volume of at least one synthetic extreme pressure anti-wear liquid oil, and
   (h) from about 0% to about 1% by volume of at least one optical brightener.

8. A solid lubricant for lubricating a railcar wheel flange, said lubricant formulated to vary the rate at which the lubricant is applied and absorbed, said lubricant comprising:

a first portion comprising: from about 25% to about 70% by volume of a first polymeric carrier, from about 5% to about 75% by volume of at least one first lubricant powder, from about 0% to about 20% by volume of a at least one synthetic extreme pressure anti-wear liquid oil, and from about 0% to about 1% by volume of a least one optical brightener;

a second portion comprising: from about 25% to about 70% by volume of a second polymeric carrier, from about 5% to about 75% by volume of at least one second lubricant powder, from about 0% to about 20% by volume of at least one synthetic extreme pressure anti-wear liquid oil, and from about 0% to about 1% by volume of at least one optical brightener;

said first polymeric carrier having a lower melt flow temperature than said second polymeric carrier;

said first polymeric carrier having a higher melt index than said second polymeric carrier; and said first portion fixedly attached to said second portion, said attachment configured so as to enable said first portion to be consumed through application to a surface before said second portion is consumed through application to a surface.

9. A method of lubricating a railcar wheel flange, said method comprising the steps of:

providing a first portion comprising a first polymeric carrier;

providing a second portion comprising a second polymeric carrier;

wherein said first polymeric carrier having a lower melt flow temperature than said second polymeric carrier;

wherein said first polymeric carrier having a higher melt index than said second polymeric carrier;

fixedly attaching said first portion to said second portion;

applying said first portion to said wheel flange to reduce the coefficient of friction; and applying said second portion to said wheel flange to maintain said coefficient of friction upon depletion of said first portion.

10. The method claim 9, wherein said first portion is one-third the quantity of said second portion.

11. The method of claim 9, wherein said attachment of said first portion to said second portion is accomplished by a process from the group consisting of: welding by a double V butt weld, co-extrusion, hot air welding, high speed welding, injectiwelding, and extrusion welding.

12. The method of claim 9, wherein said first portion comprises:
 (a) from about 25% to about 70% by volume of said first polymeric carrier;
 (b) from about 5% to about 75% by volume of at least one first lubricant powder;
 (c) from about 0% to about 20% by volume of a at least one synthetic extreme pressure anti-wear liquid oil; and
 (d) from about 0% to about 1% by volume of a least one optical brightener.

13. The method of claim 9, wherein said second portion comprises:
 (a) from about 25% to about 70% by volume of said second polymeric carrier;
 (b) from about 5% to about 75% by volume of at least one second lubricant powder;
 (c) from about 0% to about 20% by volume of at least one synthetic extreme pressure anti-wear liquid oil; and
 (d) from about 0% to about 1% by volume of at least one optical brightener.

14. The method of claim 9, wherein said first portion comprises:
 (a) from about 25% to about 70% by volume of said first polymeric carrier,
 (b) from about 5% to about 75% by volume of at least one first lubricant powder,
 (c) from about 0% to about 20% by volume of a at least one synthetic extreme pressure anti-wear liquid oil, and
 (d) from about 0% to about 1% by volume of a least one optical brightener; and wherein said second portion comprises:
 (e) from about 25% to about 70% by volume of said second polymeric carrier,
 (f) from about 5% to about 75% by volume of at least one second lubricant powder,
 (g) from about 0% to about 20% by volume of at least one synthetic extreme pressure anti-wear liquid oil, and
 (h) from about 0% to about 1% by volume of at least one optical brightener.

* * * * *